July 12, 1955  S. H. DOLE ET AL  2,713,022
DEOILING WAX CAKES
Filed Nov. 26, 1949  2 Sheets-Sheet 1

Stephen H. Dole
William T. Knox, Jr  Inventors

By W. O. J Hilman  Attorney

July 12, 1955  S. H. DOLE ET AL  2,713,022
DEOILING WAX CAKES
Filed Nov. 26, 1949  2 Sheets-Sheet 2

Stephen H. Dole
William T. Knox, Jr. Inventors

By W.O.J Hulman Attorney 2,713,022
Patented July 12, 1955

2,713,022
DEOILING WAX CAKES

Stephen H. Dole, Orange, and William T. Knox, Jr., Cranford, N. J., assignors to Esso Research and Engineering Company, a corporation of Delaware Application November 26, 1949, Serial No. 129,544

3 Claims. (Cl. 196—20)

The present invention relates to a method of operating rotary filter apparatus and more particularly relates to a method of deoiling a wax cake and washing the filter cloth in a rotary filter without interrupting the filtering operation.

One of the problems in the manufacture of refined waxes by solvent dewaxing and deoiling is to produce a low oil content wax product. This is frequently attempted through washing of wax cakes with solvent as part of the filter cycle but, even so, oil contents of less than 10–12% have been difficult to obtain in plant operation. If it may be assumed that all the oil in a wet wax cake is in solution in the solvent, then it may be seen that to reduce oil content it is merely necessary to squeeze out the solvent-oil solution from the porous wax matrix. For example, a wax cake discharged from a rotary drum filter typically contains only 15 to 20% solids, the remainder being the solvent and oil. In a normal operation, with solvent dilutions of about 4 or 5 volumes solvent/volume of waxy feed, the resultant wax cake would have the composition:

70 parts solvent
15 parts oil
15 parts wax

When this is stripped of solvent, the wax product would contain 50% oil. However, if the liquid content of the cake can be reduced to 40%, the wax cake will have the composition:

32.9 parts solvent
7.1 parts oil
60 parts wax and the stripped wax cake will contain 10.5% oil. If the liquid content of the cake can be reduced further to 20%, the wax cake will have the composition:

16.5 parts solvent
3.5 parts oil
80 parts wax and the stripped wax cake will contain 4.2% oil.

In the past, attempts have been made to compress the wax cakes on the rotary filter. These attempts have resulted in plugging or blinding the filter cloth, which has necessitated frequent shutdowns to clean out the cloth. Furthermore, it has always been customary to wash the filter cloth with warm kerosene or solvent at least once a day, and frequently two or three times daily, to clean the cloth of small wax crystals which have become imbedded. This has made it necessary in many instances to provide at least one additional filter in a group of six to provide the necessary filtering capacity. Considerable savings in plant investment would be possible if it were possible to operate each filter continuously in filtration service.

According to the process of the present invention, the wax cakes are compressed on fabric strips to remove the solvent and oil, while blinding of the fabric is prevented by continuously washing the fabric in a simultaneous operation. The cake may be compressed either on the drum or withdrawn and compressed between auxiliary fabric strips. When the former method is used the cake is compressed, on the upper part of the drum, the wax cake discharged, and the blanket washed with hot solvent before being returned to the lower or suction part of the filter. In the second embodiment the cake is removed from the drum, passed between layers of fabric and compressed. The fabric is then passed through a washing solution to dissolve absorbed oil and to remove wax embedded within the fabric causing blinding.

The present invention will be more clearly understood from the following detailed description of the accompanying drawings in which.

Figure 1:
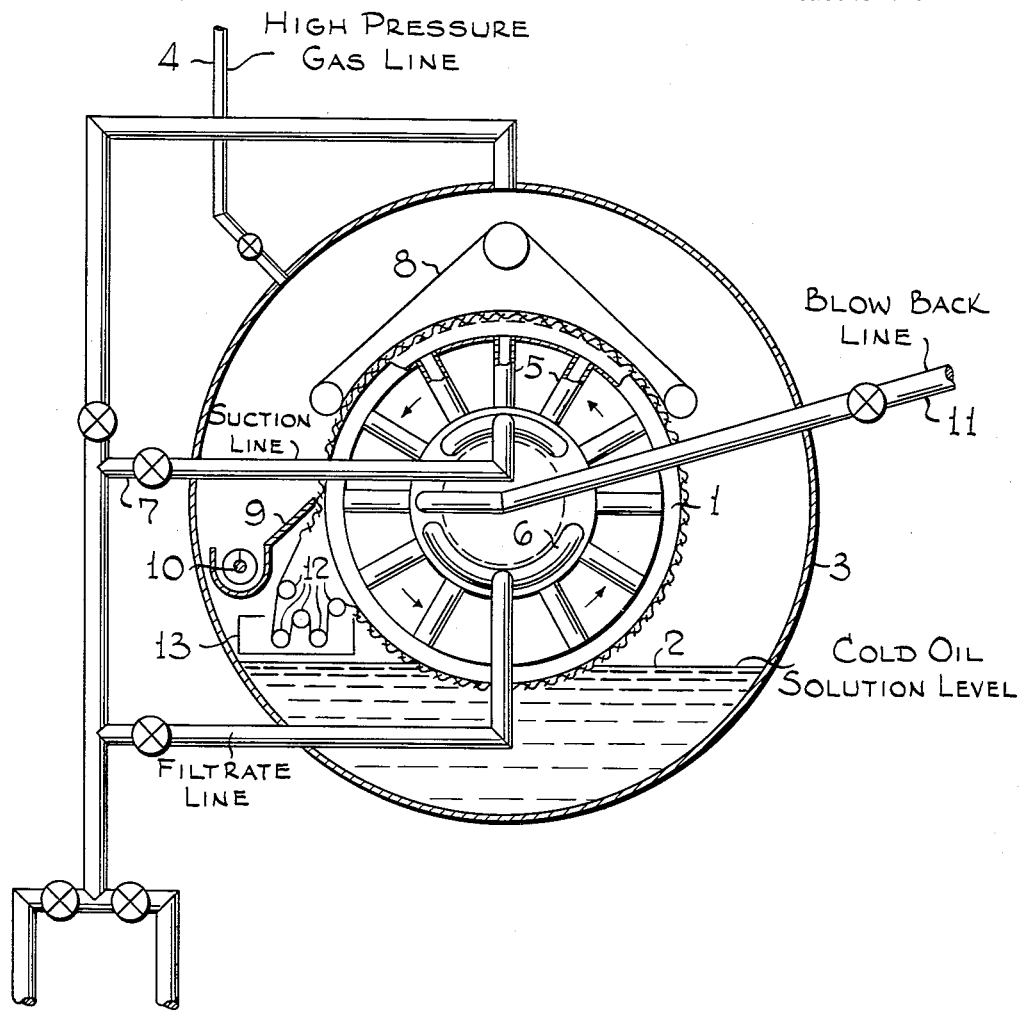
Figure 1 is a side elevation, partly in section, of a drum filter modified for the practice of the present invention.

The operating procedure contemplated may be adequately illustrated by reference to a filter in service as a dewaxing unit, in which the filter drum 1 is rotated through a body 2 of a chilled solution of a wax-containing lubricating oil maintained at a substantially constant intermediate level in the filter shell 3. Filtration of such a material is obtained by maintaining a superatmospheric pressure in the shell of the filter, by means of the gas pressuring line 4, while placing suction on the interior lines 5 of the filter drum which open into the plurality of filtrate collection zones 6, located below the filter surface. During the rotation of the drum, filtrate is drawn from these zones while they are submerged in the feed material, and by maintaining suction through a separate line 7, the wax cake formed on the filter surface is partially dried as the drum continues its rotation into the gas filled upper portion of the shell.

As the drum continues to rotate it brings the partially dried wax cake into contact with compression belt 8 which fits firmly over the top of drum 1. In this manner the wax cake is subjected to sufficient compression to reduce the oil content thereof to 5% or less.

As the drum continues to rotate, it brings the wax cake into contact with a knife-like deflector blade 9 which removes the cake from the drum into a trough 10 from which it is conveyed outside the shell. It is customary to introduce a pressure gas by way of line 11 through the filtrate collection lines in the drum just prior to the approach of each section served thereby to the deflector element, in order to loosen the cake from the filter cloth. After the cake has been discharged, the blanket is passed over rollers 12 through wash tank 13 and back onto drum 1.

Figure 2:
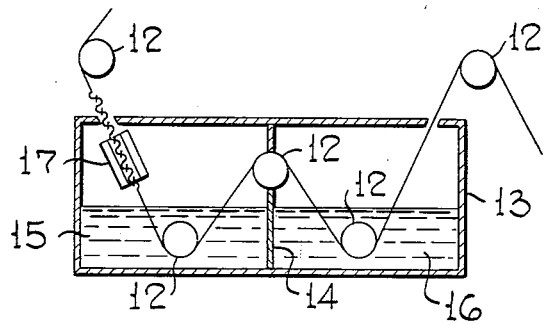
Figure 2 is an enlarged view in elevation of the filter cloth washing zone of Figure 1.

Referring to Figure 2, tank 13 is shown divided by partition 14 into sections 15 and 16. Section 15 is shown provided with heater 17 for heating the blanket as it enters tank 13 so as to melt the embedded wax. The bottom of tank 13 is covered to a depth of six inches or more with a solvent such as kerosene or a solvent having the same composition as the dewaxing solvent which dissolves out the wax from the blanket. The solvent in section 15 is preferably heated to a temperature about 150° F. After passing through the warm solvent in section 15 the blanket is passed into section 16 where it is washed with solvent at about 50° F. and all traces of wax are completely removed. The chilled blanket is then returned to drum 1 where it continues the usual cycle, while the wash solvent may be recycled to be re-used for dilution of the original waxy feed stock.

Figure 3:
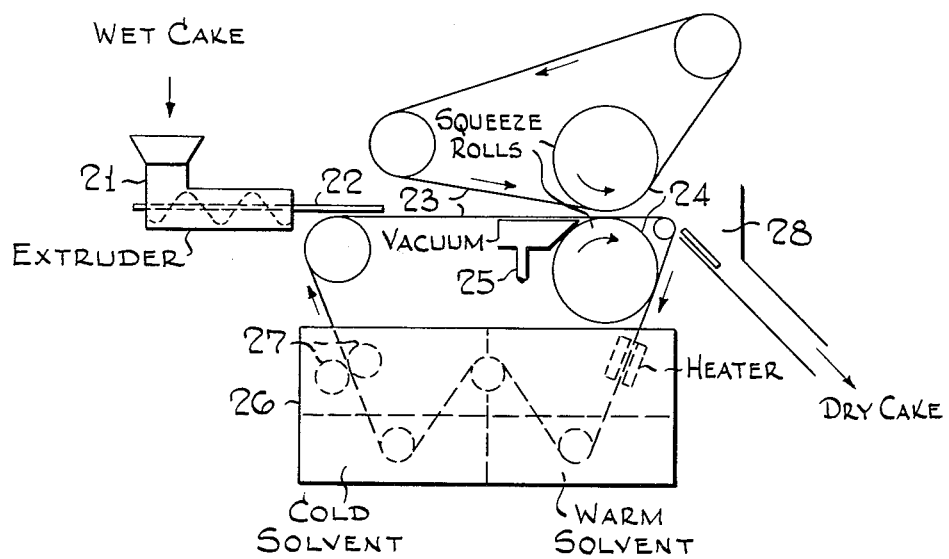
Figure 3 illustrates another embodiment of the invention in which the wax cake is deoiled after it is removed from the drum.

In Figure 3 is shown another method for deoiling wax cakes by compression.

A wax cake taken from the wax discharge scroll of a conventional rotary filter is introduced into extruder 21 from which it emerges in the form of thin sheets 22. These sheets are placed between two strips of fabric 23 and passed between two squeeze cylinders 24 set parallel to each other and a small distance apart. In this manner the solvent and oil in the wax is removed and withdrawn through line 25 by suction or other means. The lower fabric is porous to permit the passage of oil-solvent solution while the upper fabric is preferably non-porous. The lower fabric is then passed into wash tank 26 which is similar in all respects, except that the chilled fabric as it emerges from section 16 may be passed through wringers 27 to partially dry the porous fabric, to the wash tank 13 of Figures 1 and 2. Dry cake is discharged through chute 28, whence it is conveyed by suitable means to a stripping zone where it is stripped of solvent for further processing to make merchantable wax.

To determine the effectiveness of compression on canvas strips in deoiling a wax cake by reducing the liquid content of the cake the following experiment was carried out:

A slurry was made up by dissolving 1 part of reduced San Joaquin paraffin distillate in 4 parts of solvent (secondary butyl acetate) and chilling to 75° F. The reduced San Joaquin paraffin distillate employed as a waxy feed stock in this experiment had a 31.6° API gravity, 400° F. flash point, 115° F. pour point, 41.1 sec. Saybolt viscosity at 210° F., 398° F. initial boiling pt. @ 10 mm. and a 608° F. final boiling pt. @ 10 mm. The above slurry was filtered, using vacuum, whereupon a wet wax cake was obtained having the composition:

41.4 parts solvent
8.1 parts oil
50.5 parts wax or, on a solvent-free basis, the wax contained 13.8% oil. This wet cake was distributed on a canvas strip, covered with a second canvas strip and the entire "sandwich" fed between two metal cylinders set a small distance apart and held together by spring tension.

After being compressed one time, the solvent content of the wax cake was reduced to 21.9% and the wax cake, on a solvent-free basis, contained 5.5% oil. The compressed wax filter cake from this operation was placed between a second pair of canvas strips and recompressed whereupon the solvent content of the cake was further reduced to 15.1% and the oil content, on a solvent-free basis was 3.5%. With more efficient compressing equipment, it should be possible to reduce both solvent contents and oil contents to even lower levels.

The nature of the present invention having thus been described, what is claimed as new and useful and desired to be secured by Letters Patent is:

1. A process of removing a liquid comprising oil and solvent from a wax filter cake obtained by solvent dewaxing a wax bearing mineral oil which comprises maintaining a plurality of treating zones at spaced points along the travel path of a continuously moving, endless belt type of filter member; depositing the wax cake upon said filter member in a first of said treating zones; compressing the wax cake in a second of said zones whereby oil and solvent are squeezed from the cake; removing the pressed wax cake from the filter member in a third of said zones; contacting the filter member in a solvent bath with a wax solvent in a fourth of said zones whereby occluded wax is removed from said filter member and returning the filter member to the first of said treating zones.

2. The process as defined in claim 1 in which the solvent bath in the fourth treating zone comprises a warm bath at about 150° F. followed by a cold bath at about 50° F.

3. Process as defined in claim 2 in which the filter member is a porous fabric.

References Cited in the file of this patent

UNITED STATES PATENTS

| | | |
|---|---|---|
| 512,231 | Smales | Jan. 2, 1894 |
| 1,472,574 | Wright et al. | Oct. 30, 1933 |
| 1,958,279 | Morgan | May 8, 1934 |
| 2,061,257 | Sablik | Nov. 17, 1936 |
| 2,081,296 | Gard | May 25, 1937 |
| 2,097,529 | Nordell | Nov. 2, 1937 |
| 2,101,042 | Casey | Dec. 7, 1937 |
| 2,245,952 | Aitken et al. | June 17, 1941 |
| 2,484,304 | Long et al. | Oct. 11, 1949 |

FOREIGN PATENTS

| | | |
|---|---|---|
| 5,986 | Great Britain | May 25, 1937 |